US008871297B2

(12) United States Patent
Barnett et al.

(10) Patent No.: US 8,871,297 B2
(45) Date of Patent: Oct. 28, 2014

(54) METHOD OF APPLYING A NANOCRYSTALLINE COATING TO A GAS TURBINE ENGINE COMPONENT

(76) Inventors: Barry Barnett, Markham (CA); Kin-Leung Cheung, Toronto (CA); Thomas McDonough, Barrie (CA); Andreas Eleftheriou, Woodbridge (CA); Enzo Macchia, Kleinburg (CA)

(*) Notice: Subject to any disclaimer, the term of this patent is extended or adjusted under 35 U.S.C. 154(b) by 278 days.

(21) Appl. No.: 13/188,938

(22) Filed: Jul. 22, 2011

(65) Prior Publication Data
US 2012/0082783 A1    Apr. 5, 2012

Related U.S. Application Data

(60) Provisional application No. 61/388,364, filed on Sep. 30, 2010.

(51) Int. Cl.
| | | |
|---|---|---|
| B05C 13/00 | (2006.01) | |
| B05D 3/10 | (2006.01) | |
| B82Y 30/00 | (2011.01) | |
| C23C 18/16 | (2006.01) | |
| C23C 30/00 | (2006.01) | |
| F01D 5/30 | (2006.01) | |
| C23C 28/02 | (2006.01) | |
| B22F 1/00 | (2006.01) | |

(52) U.S. Cl.
CPC ............. *F01D 5/3092* (2013.01); *B82Y 30/00* (2013.01); *C23C 18/1651* (2013.01); *C23C 30/00* (2013.01); *F05D 2300/172* (2013.01); *C23C 18/1637* (2013.01); *C23C 28/023* (2013.01); *B22F 1/0018* (2013.01)
USPC ........................... 427/142; 427/304; 427/437

(58) Field of Classification Search
CPC  C23C 18/16; C23C 18/1637; C23C 18/1633; C23C 18/1651; C23C 18/165
USPC ....................... 427/304, 305, 437, 438, 443.1
See application file for complete search history.

(56) References Cited

U.S. PATENT DOCUMENTS

| | | | |
|---|---|---|---|
| 4,921,405 A * | 5/1990 | Wilson ....................... 416/241 R |
| 5,486,096 A | 1/1996 | Hertel et al. | |
| 6,110,604 A | 8/2000 | Rickerby | |
| 6,482,532 B1 | 11/2002 | Yap et al. | |
| 6,482,537 B1 | 11/2002 | Strangman et al. | |
| 6,617,049 B2 | 9/2003 | Darolia et al. | |
| 6,620,525 B1 | 9/2003 | Rigney et al. | |
| 6,723,387 B1 | 4/2004 | Kear et al. | |
| 6,773,817 B1 | 8/2004 | Sagel et al. | |
| 6,875,529 B1 * | 4/2005 | Spitsberg et al. ............. 428/701 |
| 6,887,589 B2 | 5/2005 | Darolia et al. | |

(Continued)

FOREIGN PATENT DOCUMENTS

WO    2009006871 A2    1/2009

*Primary Examiner* — Dah-Wei D Yuan
*Assistant Examiner* — Nga Leung V Law
(74) *Attorney, Agent, or Firm* — Norton Rose Fulbright Canada LLP

(57) ABSTRACT

A method of applying a nanocrystalline coating to a gas turbine engine component is described. The method comprises the steps of applying an intermediate bond coat to at least a portion of the component, and then applying the nanocrystalline coating to at least the portion of the component overtop of the intermediate bond coat. The component may include, for example, a blade of which a dovetail portion of the blade root is protected by applying the intermediate bond coat and the nanocrystalline coating thereto.

8 Claims, 3 Drawing Sheets

(56) References Cited

U.S. PATENT DOCUMENTS

| | | |
|---|---|---|
| 7,108,485 B2 | 9/2006 | Wobben |
| 7,186,092 B2 | 3/2007 | Bruce et al. |
| 7,247,348 B2 | 7/2007 | Power |
| 7,300,708 B2 | 11/2007 | Gigliotti, Jr. et al. |
| 7,311,981 B2 | 12/2007 | Saint Ramond et al. |
| 7,320,832 B2 | 1/2008 | Palumbo et al. |
| 7,354,354 B2 | 4/2008 | Palumbo et al. |
| 7,387,578 B2 | 6/2008 | Palumbo et al. |
| 7,387,587 B2 | 6/2008 | Dean |
| 7,431,566 B2 | 10/2008 | Gray et al. |
| 7,517,930 B2 | 4/2009 | Eschborn et al. |
| 2002/0045053 A1* | 4/2002 | Hoskin .................... 428/469 |
| 2004/0172827 A1* | 9/2004 | Kinstler et al. ............. 29/889.7 |
| 2005/0133121 A1 | 6/2005 | Subramanian et al. |
| 2007/0099027 A1 | 5/2007 | Krishnamurthy et al. |
| 2008/0298976 A1* | 12/2008 | Kriegl .................... 416/241 R |
| 2009/0229984 A1* | 9/2009 | Schuh et al. ................ 205/50 |
| 2010/0055339 A1* | 3/2010 | Shinde et al. ................ 427/451 |

* cited by examiner

US 8,871,297 B2

METHOD OF APPLYING A NANOCRYSTALLINE COATING TO A GAS TURBINE ENGINE COMPONENT

CROSS-REFERENCE TO RELATED APPLICATIONS

The present application claims priority on U.S. Provisional Patent Application No. 61/388,364 filed Sep. 30, 2010, the entire contents of which is incorporated herein by reference.

TECHNICAL FIELD

The application relates generally to gas turbine engines and, more particularly, to the application of a coating to a component, such as a fan blade and/or other airfoil, used in a gas turbine engine.

BACKGROUND OF THE ART

Gas turbine parts such as blade and other airfoils, and particularly fan blades, experience excessive galling and wear on the dovetail pressure surfaces. This is especially true for titanium (Ti) blades on titanium hubs, with the Ti on Ti contact resulting in high coefficients of friction and high material transfer rates. This results in premature blade retirement and a significant increase in maintenance costs. Additionally, surface contact points, under conditions of blade wind-milling, are subject to many cycles of low contact loads that result in wear. Traditionally, gas turbine manufacturers have overcome these issues by reducing contact stress levels, using sacrificial shims, such as shown in U.S. Pat. No. 5,160,243. The problem with these shims is that they require periodic replacement, add fan blade assembly complications and may result in fragment release if they fail. Accordingly, there is a need to provide improved protection to the blade dovetail surfaces.

SUMMARY

In accordance with one aspect of the present application, there is provided a method of applying a nanocrystalline coating to a gas turbine engine component composed of a first metallic material, the method comprising the steps of: applying an intermediate bond coat to at least a portion of the component; and then applying the nanocrystalline coating to at least said portion of the component overtop of the intermediate bond coat.

There is also provided, in accordance with another aspect of the present application, a method of protecting a blade of a gas turbine engine, the blade having a blade root and an airfoil extending therefrom, the method comprising the steps of: applying an intermediate bond coat to at least a dovetail portion of the blade root; and then applying a nanocrystalline coating to at least said dovetail portion of the blade root, overtop of the intermediate bond coat.

DESCRIPTION OF THE DRAWINGS

Reference is now made to the accompanying figures in which.

DETAILED DESCRIPTION

Figure 1:
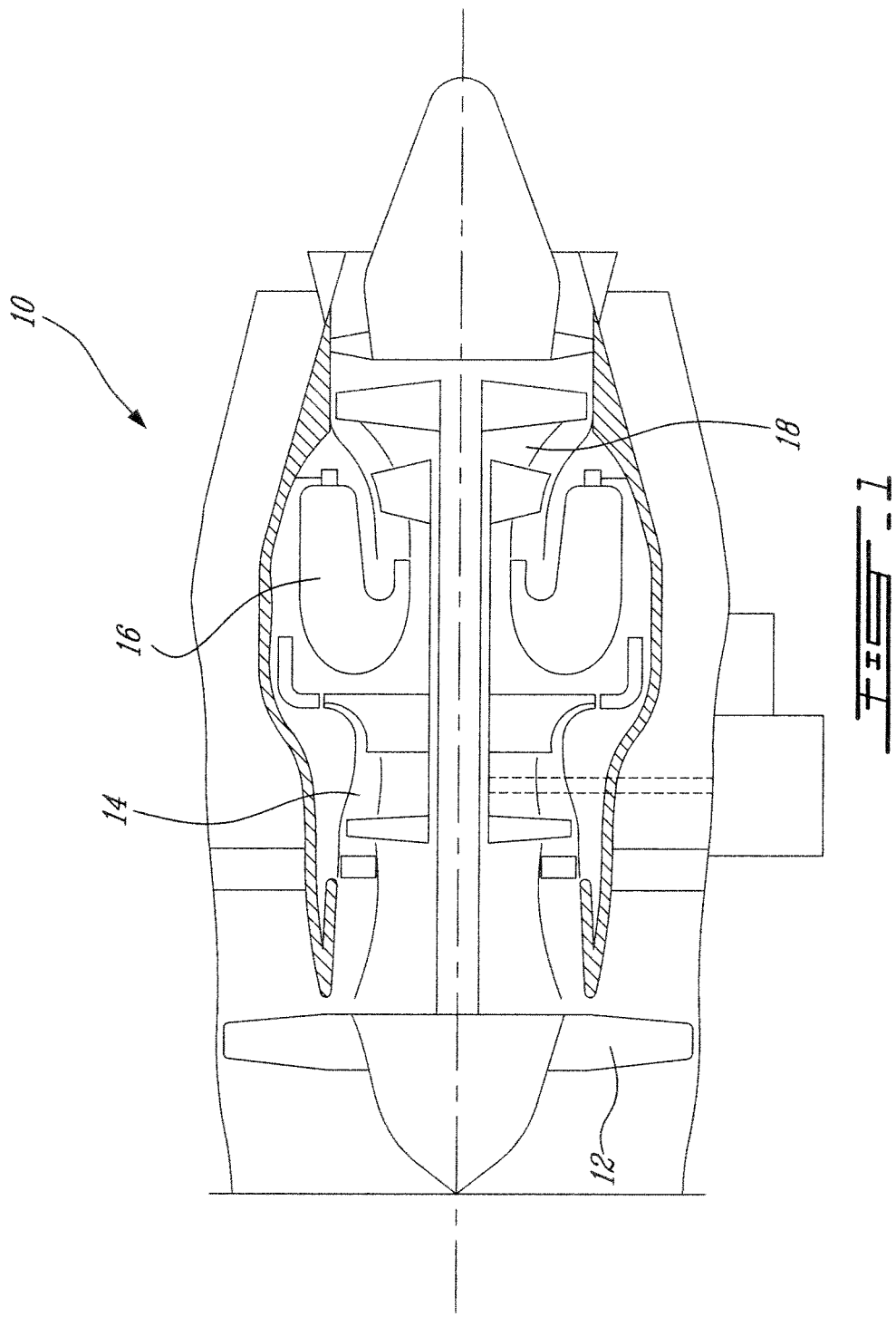
FIG. 1 is a schematic cross-sectional view of a gas turbine engine.

FIG. 1 illustrates a gas turbine engine 10 generally comprising, in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
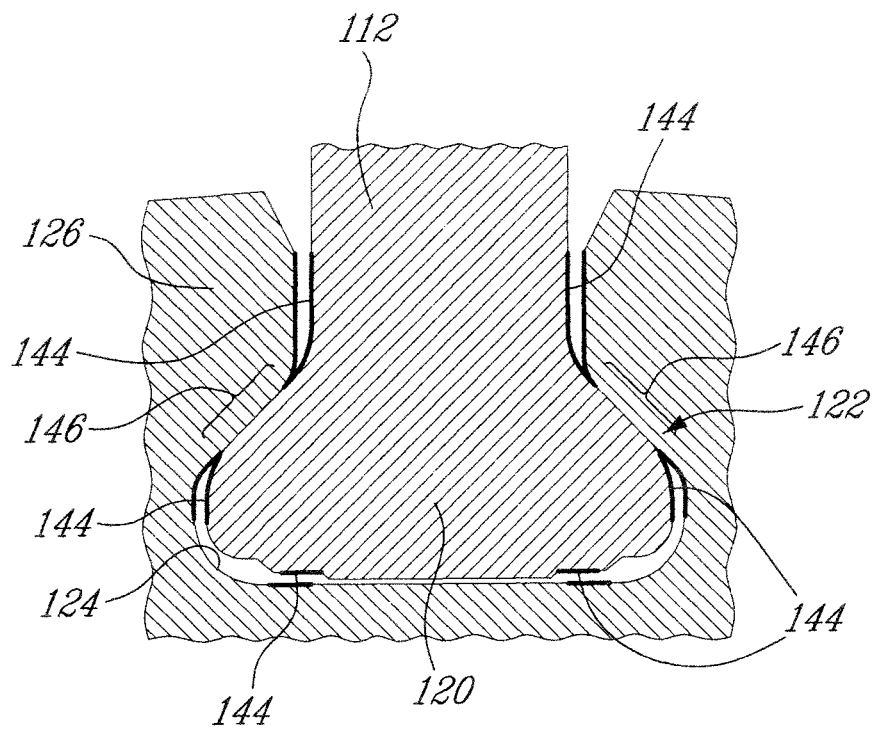
FIG. 2 is a cross-sectional view of a portion of a prior art fan blade dovetail, showing the wear and damage typical to conventional designs.

Referring to FIG. 2, a typical fan blade 112 of the prior art has a blade root 120 having a dovetailed shape portion at is proximal end (and which root is thus often simply referred to as a "dovetail"). The dovetail of the root 120 has a pressure side surface 122 that is subject to wear of the type described above. The dovetail 120 of the root of the blade 112 fits within corresponding dovetail-shaped slots 124 in the disk lug 126. While the wear areas 144 as shown in FIG. 2 may be prone to some wear and thus also experience deterioration with time during use, the fretting areas 146 on sloping surfaces of the dovetail 120 are most particularly subject to fretting wear of the type noted above.

Figure 3:
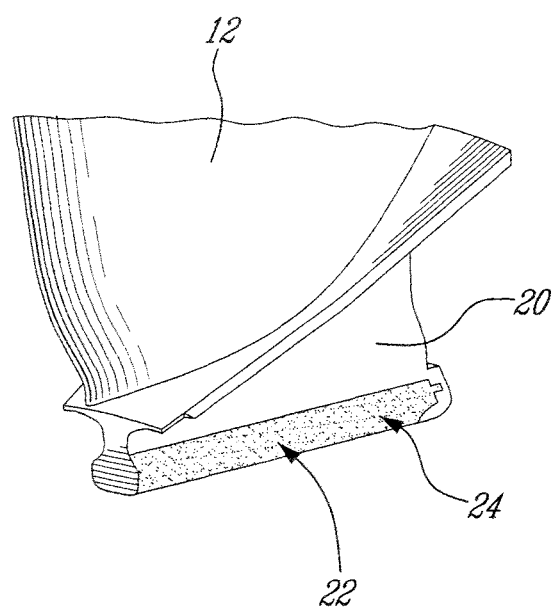
FIG. 3 is an enlarged isometric view of a root of a fan blade for use in the engine of FIG. 1, protected by a coating as described herein, showing the fan blade and dovetail of the blade root.
Figure 4:
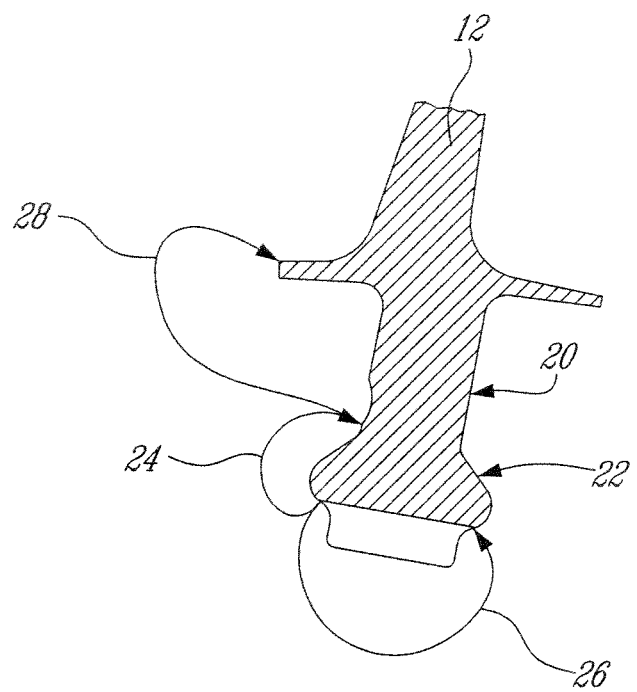
FIG. 4 is a enlarged partial cross-sectional view of one example of a fan blade according to FIG. 3.

Referring to FIG. 3, the blade 12 in accordance with one embodiment of the present disclosure has a blade root or dovetail 20 having a wear surface 22 thereon that is coated with a nanocrystalline metal coating (i.e. a "nano coating") 24 thereon. The wear surface 22, or bearing surface, may be for example a region of expected fretting wear corresponding to the fretting areas 146 described above, and thus may comprise an angled bearing surface which contacts a corresponding surface within the dovetail slot of the hub. The nanocrystalline metal coating 24 is, in at least one embodiment, applied to at least the wear surface 22 on the pressure side of the dovetail. However, it is understood that the presently described nanocrystalline metal coating 24 may be applied to both the pressure and suction sides of the dovetail 20, either exclusively on the wear surface areas 22 or beyond (including covering the entire blade root, for example). The nanocrystalline metal coating 24, such as Nanovate (a trademark of Integran Technologies) nickel (Ni) or copper (Cu), is applied to at least the pressure side wear surface 22 of the fan blade, in order to provide a wear-resistant surface to the blade. The nanocrystalline metal coating 24 may be applied to the dovetail pressure side wear surface 22 only, or alternately may be applied to more of, including the entirety of, the dovetail 20, as shown in FIG. 4 for example.

The present method of applying the nanocrystalline metal coating 24 may include a plating technique or other suitable method used to deposit a suitable material (example: Ni or Cu) in nanocrystalline grain structure over the desired portion of the blade dovetail. The nanocrystalline metal coating 24 may also reduce friction coefficients between blade 12 and the hub within which the root 20 thereof is received.

The thickness of the nanocrystalline metal coating 24 may range between about 0.001 inch to about 0.125 inch (about 0.0254 mm to about 3.175 mm), and more preferably between 0.001 inch (0.0254 mm) and 0.008 inch (0.2032 mm), but may depend on the clearance available in the particular blade and hub design. In one particular example, the nanocrystalline metal coating 24 is about 0.005 inches (0.127 mm) in thickness. In another example, coating thickness varies so as to be locally thicker in regions where higher load contact stresses are present.

The nano coating is composed of a material different to that of the blade and/or hub, and therefore provides a surface of a material dissimilar to the blade hub, which reduces galling caused in conventional assemblies by contact between similar materials used for blade root and hub. Using a coating procedure as described herein may also simplify the assembly relative to prior art designs which employ shims and other anti-wear devices.

The nanocrystalline metal coating may be applied directly to the substrate, such as the titanium dovetail of the blade root, or alternately to an intermediate bond coat disposed on the substrate. The intermediate bond coat may be first applied to the substrate to be protected, prior to the application of the nano coating, in order to improve bonding to the blade substrate to prevent separation of the nanocrystalline metal coating from the blade, in the event that improved bonding between the substrate and nanocrystalline metal coating is deemed to be required.

The nanocrystalline metal coating 24 forms an outer layer which acts structurally to strengthen the dovetail 20 and to protect it against wear and fretting, and to improve fatigue endurance. Due to the nanocrystalline grain size, the nano coating provides for improved structural properties and for improved fatigue endurance of the dovetail. The nano coating metal grain size may range between about 2 nm and 5000 nm. The nano coating may be a nickel (Ni), copper (Cu), cobalt-phosphorous (CoP) or another suitable metal or metal alloy, such as Co, Cr, Fe, Mo, Ti, W, or Zr. The manipulation of the metal grain size, when processed according to the methods described herein, produces the desired mechanical properties. The nanocrystalline metal coating may be composed of a pure or single metal, such as Ni or Co for example. It is to be understood that the term "pure" or "single" as used herein is intended to include a metal comprising trace elements of other components. As such, in a particular embodiment, the nano metal topcoat 24 comprises a Nickel coating which includes trace elements such as, but not limited to: Carbon (C)=200 parts per million (ppm), Sulphur (S)<500 ppm, Cobalt (Co)=10 ppm, and Oxygen (O)=100 ppm.

The nanocrystalline metal coating 24 may be a metal selected from the group consisting of: Ni, Co, Al, Cu, Cr, Fe, Mo, Pt, Ti, W, and Zr, and is purposely composed of a single metal in that it exists no other intentionally added elements. In one particular embodiment, the single metal is selected from the group consisting of: Co, Cu, Cr, Fe, Mo, Ni, W and Zr. The manipulation of the metal grain size produces the desired mechanical properties for the gas turbine engine blade. In a particular embodiment, the nanocrystalline metal coating 24 is a single metal such as nickel (Ni) or cobalt (Co), such as for example Nanovate™ nickel or cobalt (trademark of Integran Technologies Inc.) respectively, although other metals can alternately be used, such as for example copper (Cu) or one of the above-mentioned metals. The nanocrystalline metal coating is intended to have grain size in the nano meter scale and is purposely not alloyed for specific material properties. As noted above, it is to be understood that the term "single metal" is intended to include a metal perhaps comprising trace elements of other components but otherwise unalloyed with another metal.

The nano coating may be applied, according to the present method, through a plating process in a bath, such as to apply the fine-grained (i.e. nano-scale) metallic coating to the component or article to be coated. However, any suitable plating or other coating process can be used, such as for instance the plating processes described in U.S. Pat. No. 5,352,266 issued Oct. 4, 1994; U.S. Pat. No. 5,433,797 issued Jul. 18, 1995; U.S. Pat. No. 7,425,255 issued Sep. 16, 2008; U.S. Pat. No. 7,387,578 issued Jun. 17, 2008; U.S. Pat. No. 7,354,354 issued Apr. 8, 2008; U.S. Pat. No. 7,591,745 issued Sep. 22, 2009; U.S. Pat. No. 7,387,587 B2 issued Jun. 17, 2008 and U.S. Pat. No. 7,320,832 issued Jan. 22, 2008; the entire contents of each of which is incorporated herein by reference. Any suitable number of plating layers (including one or multiple layers of different grain size, and/or a thicker layer having graded average grain size and/or graded composition within the layer) may be provided. The nanocrystalline metals(s) used is/are variously described in the patents incorporated by reference above.

The nanocrystalline metal coating 24 has a fine grain size, which provides improved structural and fatigue properties to the blade root or, in the case of another components coated with this coating, the portion of the component to which it is applied. The nanocrystalline metal coating is a fine-grained metal, having an average grain size at least in the range of between 1 nm and 5000 nm. In a particular embodiment, the nanocrystalline metal coating has an average grain size of between about 10 nm and about 500 nm. More preferably, in another embodiment the nanocrystalline metal coating has an average grain size of between 10 nm and 50 nm, and more preferably still an average grain size of between 10 nm and 25 nm.

In another embodiment, the above-described nano coating is applied to a conventional fan blade which has already experienced fretting and wear of the type described above—i.e. the coating is applied over the worn but reworked and refinished surface, which may permit the re-entry into service of a fan blade which otherwise would have been required to be retired from service and scrapped. Hence, the application of the nanocrystalline metal coating may be used as a method of repairing worn blades, thereby structurally strengthening the fan blades and providing them with a shield against further wear. In the case where the worn blade is titanium, as is the hub, the application of a non-titanium nano coating, such as those described above, will prevent Ti on Ti contact, which may assist in preventing high friction and cohesive material transfer caused by such contact.

Many conventional fan blades are made from titanium alloy. The inventors have found that Ti alloys bond poorly to nanocrystalline coatings and would otherwise present reliability and durability issues if left unaddressed. It has been found that improved results may be obtained when the nanocrystalline metal coating is applied onto an intermediate bond coat, previously provided on the substrate of the blade, instead of plating directly to the titanium alloy substrate of the blade. This intermediate bond coat may be made of electroless Ni plate.

Figure 5:
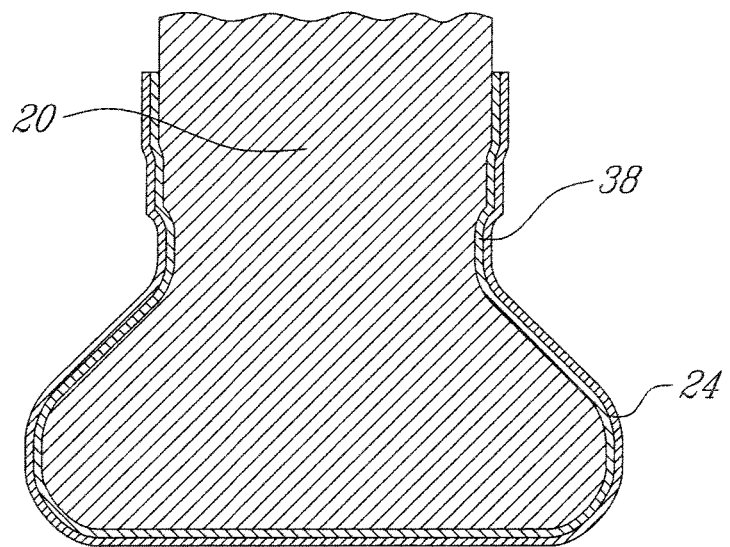
FIG. 5 is a further enlarged partial cross-sectional view of another example of the fan blade according to the present disclosure.

Therefore, referring to FIG. 5, in one aspect the present method involves the application of an intermediate bond coat 18 to the titanium base material of the dovetail 20, the intermediate bond coat being composed of an electroless nickel plate 18, applied using a plating technique to treat the titanium dovetail surface(s), prior to the application of the outer nanocrystalline coating 24. The electroless nickel bond coat 18 therefore provides the titanium alloy substrate with an interface which will yield good bonding with reliable and durable plating performance with the subsequently applied nanocrystalline coating 24 deposited overtop. The thickness of the electroless Ni plate bond coat 18 may vary depending on the application. In one example, the thickness of the electroless nickel plate bond coat 18 is in the range of 0.00005 inch (0.00127 mm) to 0.0002 inch (0.00508) thick, but it may optionally be up to 0.001 inch (0.0254 mm) thick. It is to be understood that the intermediate bond coat may be composed of elements other than Nickel, for example elements such as Phosphorus (P), Boron (B), Thallium (Tl), etc, and will depend on the material of the substrate (i.e. the blade root), as well as that of the nanocrystalline metal coating.

The presently described method of applying the intermediate bond coat 38 of electroless nickel plate and the outer nanocrystalline coating 24 may be applied during the original manufacturing of the gas turbine engine component (ex: blade), or as a repair in which the coatings are added to the dovetail of a blade which has already been in service, whether or not the blade has yet experienced any wear. In one example, the repair is applied to a Ti fan blade which has previously had no nanocrystalline coating but has experienced wear in the field. The repair may involve, as necessary, an initial step of preparing the worn or damaged region by stripping of any pre-existing coating and/or cleaning the surface, which may also include removing any uneven or damaged surfaces, and then the application of, first, the intermediate bond coat to the prepared region, and then, the application of the outer nanocrystalline coating over the intermediate bond coat. The repair may be applied to any suitable blade composition and configuration. In another example, a previously nanocrystalline-coated blade may be refurbished by a "strip and recoat" process similar to that described above, either as a part of a regular engine maintenance program or as an on-demand repair, as required. In another example, the coating may be applied as a preventative measure to a previously uncoated blade still substantially undamaged by fretting, galling or windmilling wear, as the case may be.

The addition of nanocrystalline coating 24 to the Ti substrate of the blade root's dovetail 20 may improve fatigue endurance to the blade dovetail. The particular nanocrystalline coating may be selected to allow a desired heat transfer and/or anti-galling performance. Lubricity of the nano coating may be adjusted to make assembly of the dovetail into the rotor hub slot easier, and perhaps reduce or eliminate the need for lubricants during assembly.

In another example, a conventional nickel coating (i.e. non-nanocrystalline) may be applied to the portion of the blade which engages the rotor hub, to provide an improved blade fixing arrangement according to the present method. The coating may be applied by plating, vapour deposition or any other suitable process.

The above description is meant to be exemplary only, and one skilled in the art will recognize that changes may be made to the embodiments described without departing from the scope of the invention disclosed. For example, any suitable nanocrystalline coating and manner of applying the coating layer may be employed. The nanocrystalline coat may be placed only in regions of high stress, wear, etc, or may be placed over a greater region of the dovetail and/or blade. The coating may be provided to impede fretting or galling of the blade in use, and/or to prevent wear due to windmilling when the engine is not in use. The use of electroless nickel as an intermediate bond coat may be used to apply a nanocrystalline coating to any suitable gas turbine engine component, particularly those made of titanium or titanium alloy. Still other modifications which fall within the scope of the present invention will be apparent to those skilled in the art, in light of a review of this disclosure, and such modifications are intended to fall within the appended claims.

The invention claimed is:

1. A method of protecting a blade of a gas turbine engine, the blade having a blade root and an airfoil extending therefrom, the method comprising the steps of: applying an intermediate bond coat to at least a dovetail portion of the blade root; selecting a nanocrystalline metal coating to be a metal having an average grain size of between 10 nm and 500 nm; and then applying a the nanocrystalline metal coating to at least said dovetail portion of the blade root, overtop of the intermediate bond coat, wherein the blade is a titanium or titanium alloy, and the intermediate bond coat is selected from the group consisting of Ni, nickel alloy, P, B, Tl and combinations thereof.

2. The method of claim 1, wherein the step of applying the intermediate bond coat further comprises electroless plating the intermediate bond coat to the dovetail portion of the blade root.

3. The method of claim 1, further comprising applying the nanocrystalline metal coating by plating.

4. The method of claim 1, further comprising applying the intermediate bond coat and the nanocrystalline metal coating to at least a pressure side surface of the dovetail of the blade root.

5. The method of claim 1, wherein the dovetail portion extends axially relative to a longitudinal axis of the blade root, further comprising applying the intermediate bond coat and the nanocrystalline metal coating along a substantial axial length of the dovetail portion.

6. The method of claim 1, wherein the step of applying the intermediate bond coat further comprises applying the intermediate bond coat in a thickness of between 0.00005 inch (0.00127 mm) and 0.001 inch (0.00254 mm) thick.

7. The method of claim 6, wherein the step of applying the nanocrystalline metal coating further comprises applying the nanocrystalline metal coating in a thickness of between 0.001 inch (0.0254 mm) and 0.008 inch (0.2032 mm).

8. The method of claim 1, further comprising selecting the nanocrystalline metal coating to be a nano metal having an average grain size of between 10 nm and 25 nm.

* * * * *